United States Patent
Jain et al.

(10) Patent No.: US 9,241,351 B2
(45) Date of Patent: Jan. 19, 2016

(54) TECHNIQUES AND CONFIGURATIONS FOR TRIGGERING A PLURALITY OF WIRELESS DEVICES

(75) Inventors: Puneet Jain, Hillsboro, OR (US); Meghashree Kedalagudde, Hillsboro, OR (US); Muthaiah Venkatachalam, Beaverton, OR (US); Mo-Han Fong, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 540 days.

(21) Appl. No.: 13/610,772

(22) Filed: Sep. 11, 2012

(65) Prior Publication Data

US 2013/0115993 A1 May 9, 2013

Related U.S. Application Data

(60) Provisional application No. 61/556,109, filed on Nov. 4, 2011.

(51) Int. Cl.
*H04W 4/00* (2009.01)
*H04W 76/02* (2009.01)

(52) U.S. Cl.
CPC ............ *H04W 76/02* (2013.01); *H04W 4/005* (2013.01)

(58) Field of Classification Search
CPC .............................. H04W 76/02; H04W 4/005
USPC ........ 455/435.1, 450, 451, 452.1–452.2, 522, 455/561, 458
See application file for complete search history.

(56) References Cited

U.S. PATENT DOCUMENTS

| 8,125,892 | B1* | 2/2012 | Jokimies et al. .............. 370/216 |
| 8,218,503 | B2 | 7/2012 | Terry et al. |
| 8,244,244 | B1* | 8/2012 | Hietalahti et al. ......... 455/435.1 |
| 8,280,417 | B2 | 10/2012 | Venkatachalam et al. |
| 8,565,100 | B2 | 10/2013 | Jokimies et al. |
| 8,903,352 | B2 | 12/2014 | Ou et al. |

(Continued)

FOREIGN PATENT DOCUMENTS

WO WO2011099821 A2 8/2011

OTHER PUBLICATIONS

International Application No. PCT/US2012/030763 filed Mar. 27, 2012.

(Continued)

*Primary Examiner* — Brandon Miller
(74) *Attorney, Agent, or Firm* — Schwabe, Williamson & Wyatt, P.C.

(57) ABSTRACT

Embodiments of the present disclosure describe techniques and configurations for triggering a plurality of wireless devices such as Machine Type Communication (MTC) devices in a wireless communication network. A method may include receiving, by an interworking function (IWF) of a wireless communication network, a trigger from a machine type communication (MTC) server to initiate a communication between the MTC server and a plurality of MTC devices and sending, by the IWF, a triggering indication to the plurality of MTC devices using a radio access network (RAN) over a first reference point to a first module including a cell broadcast center (CBC) or over a second reference point to a second module including a mobility management entity (MME) or a serving general packet radio service (GPRS) support node (SGSN). Other embodiments may be described and/or claimed.

10 Claims, 5 Drawing Sheets

(56) References Cited

U.S. PATENT DOCUMENTS

| | | | |
|---|---|---|---|
| 2003/0112793 A1 | 6/2003 | Sengodan | |
| 2005/0026597 A1 | 2/2005 | Kim et al. | |
| 2005/0119008 A1 | 6/2005 | Haumont | |
| 2006/0029011 A1 | 2/2006 | Etemad et al. | |
| 2007/0123195 A1 | 5/2007 | Lv et al. | |
| 2007/0169107 A1 | 7/2007 | Huttunen | |
| 2011/0134841 A1 | 6/2011 | Shaheen | |
| 2011/0140846 A1 | 6/2011 | Blanz et al. | |
| 2011/0201343 A1 | 8/2011 | Pinheiro et al. | |
| 2011/0213871 A1 | 9/2011 | DiGirolamo et al. | |
| 2011/0238844 A1* | 9/2011 | Lu et al. | 709/227 |
| 2011/0299492 A1* | 12/2011 | Lee et al. | 370/329 |
| 2012/0106391 A1* | 5/2012 | van Loon et al. | 370/252 |
| 2012/0214520 A1* | 8/2012 | Bergqvist et al. | 455/458 |
| 2012/0250668 A1 | 10/2012 | Sampath et al. | |
| 2012/0254890 A1* | 10/2012 | Li et al. | 719/313 |
| 2012/0257571 A1 | 10/2012 | Liao | |
| 2012/0289183 A1 | 11/2012 | Tiwari | |
| 2013/0003576 A1 | 1/2013 | Segura et al. | |
| 2013/0029639 A1 | 1/2013 | Lee et al. | |
| 2013/0080597 A1 | 3/2013 | Liao | |
| 2013/0188515 A1* | 7/2013 | Pinheiro et al. | 370/254 |
| 2013/0308564 A1 | 11/2013 | Jain et al. | |
| 2014/0219182 A1* | 8/2014 | Chandramouli et al. | 370/328 |

OTHER PUBLICATIONS

International Application No. PCT/US2012/031042 filed Mar. 28, 2012.
U.S. Appl. No. 13/535,140, filed Jun. 27, 2012.
International Application No. PCT/US2011/065838 filed Dec. 19, 2011.
3GPP, "Technical Specification Group Services and System Aspects; Service requirements for Machine-Type Communications (MTC); Stage 1 (Release 12)," 3GPP TS 22.368 V11.5.0, Lte Adavanced, Jun. 29, 2012, Section 7.2.14.3, 25 pages.
3GPP, "Technical Specification Group Core Network and Terminals; Technical realization of Cell Broadcast Service (CBS) (Release 11)," 3GPP TS 23.041 V11.3.0, Jun. 27, 2012, Section 9.4.1.2.2, 62 pages.
3GPP, "Technical Specification Group Services and System Aspects; System Improvements for Machine-Type Communications (Release 11)," 3GPP TR 23.888 V1.7.0, Lte, Aug. 17, 2012, 165 pages.
3GPP, "Technical Specification Group Radio Access Network; Broadcast/Multicast Control (BMC) (Release 10)," 3GPP TS 25.324 V10.0.0, Mar. 31, 2011, 26 pages.
3GPP, "Technical Specification Group Radio Access Network; UTRAN Iu-BC Interface: Service Area Broadcast Protocol (SABP) (Release 10)," 3GPP TS 25.419 V10.2.0, Sep. 27, 2011, 78 pages.
3GPP, "Technical Specification Group GSM/EDGE Radio Access Network; Base Station Controller-Base Transceiver Station (BSC-BTS) interface; Layer 3 specification (Release 10)," 3GPP TS 48.058 V10.0.0, GSM Global System for Mobile Communications, Mar. 23, 2011, 84 pages.
3GPP, "Technical Specification Group GSM/EDGE Radio Access Network; Short Message Service Cell Broadcast (SMSCB) support on the mobile radio interface (Release 10)," 3GPP TS 44.012 V10.0.0, GSM Global System for Mobile Communications, Mar. 23, 2011, 14 pages.
3GPP, "Technical Specification Group Services and System Aspects; General Packet Radio Service (GPRS) enhancements for Evolved Universal Terrestrial Radio Access Network (E-UTRAN) access (Release 12)," 3GPP TS 23.401 V12.1.0 (Jun. 2013), Jun. 24, 2013, Lte Advanced, 291 pages.
International Search Report and Written Opinion mailed Mar. 20, 2013 from International Application No. PCT/US2012/063065.
3GPP, "Technical Specification Group Services and System Aspects;System Improvements for Machine-Type Communications;(Release 11)," 3GPP TR 23.888 V1.5.0, Lte, Oct. 2011, 155 pages.
International Search Report and Written Opinion mailed Jun. 28, 2012 from International Application No. PCT/US2012/030763.
International Preliminary Report on Patentability mailed Jan. 29, 2013 from International Application No. PCT/US2012/030763.
International Search Report and Written Opinion mailed Jun. 28, 2012 from International Application No. PCT/US2012/031042.
3GPP, "Technical Specification Group Services and System Aspects; Service requirements for Machine-Type Communications (MTC); Stage 1 (Release 10)," 3GPP TS 22.368 V10.0.0, Lte, Mar. 2010, 25 pages.
3GPP, "Technical Specification Group Services and System Aspects; System Improvements for Machine-Type Communications; (Release 10)," 3GPP TR 23.888V0.3.2, Lte, Mar. 2010, 33 pages.
3GPP, "Technical Specification Group Services and System Aspects; Architecture Enhancements to facilitate communications with Packet Data Networks and Applications; (Release 11)," 3GPP TS 23.682 V0.2.0 , Lte, Feb. 2012, 23 pages.
U.S. Appl. No. 13/610,772, filed Sep. 11, 2012.
Office Action issued in U.S. Appl. No. 13/535,140, mailed on Jan. 3, 2014.
Notification Concerning Transmittal of International Preliminary Report on Patentability mailed on May 15, 2014 from International Application No. PCT/US2012/063065.
Office Action issued Feb. 27, 2015 from U.S. Appl. No. 13/535,140.
Office Action issued Jul. 14, 2015 from Korean Patent Application No. 2014-7012164.
3GPP, "Technical Specification Group Core Network and Terminals; Technical realization of Cell Broadcast Service (CBS) (Release 10)," 3GPP TS 23.041 V10.1.0 (Dec. 2010), GSM, Global System for Mobile Communications, 11 pages.
Extended European Search Report issued Jun. 1, 2015 from European Patent Application No. 12846270.2.
KPN, "Analysis of MTC requirements on identifiers," SA WG2 Meeting #86, S2-113447, Agenda Item: 9.4.2.3, Jul. 11-15, 2011, Naantali, Finland.
Office Action issued Apr. 16, 2015 from Japanese Patent Application No. 2014-540087.
3GPP, "Way forward on Rel. 10 feedback," 3GPP TSG RAN WG1 Meeting #60bis, R1-102579, Agenda item: 6.3.4.2, Apr. 12-16, 2010, Beijing, China, 2 pages.
Samsung, "Detailed description for EAB solutions," 3GPP TSG RAN WG2 #75, R2-114395, Agenda Item: 4.3.1, Aug. 22-26, 2011, Athens, Greece, 4 pages.
Samsung, "Approach for EAB notification," 3GPP TSG RAN WG2 #75bis, R2-115036, Agenda Item: 4.3.1, Oct. 10-14, 2011, Zhuhai, China, 4 pages.
LG Electronics Inc., "PWS-like Broadcast for MTC," 3GPP TSG-RAN WG2 #71, R2-104561, Agenda Item : 4.123, Aug. 23-28, 2010, Madrid, Spain, 2 pages.
LG Electronics Inc., "PWS-like Broadcast for MTC," 3GPP TSG-RAN WG2 #70bis, R2-103701, Agenda Item : 4.3.2.3, Jun. 28-Jul. 2, 2010, Stockholm, Sweden, 2 pages.

\* cited by examiner

TECHNIQUES AND CONFIGURATIONS FOR TRIGGERING A PLURALITY OF WIRELESS DEVICES

CROSS REFERENCE TO RELATED APPLICATIONS

The present application claims priority to U.S. Provisional Patent Application No. 61/556,109, filed Nov. 4, 2011, entitled "ADVANCED WIRELESS COMMUNICATION SYSTEMS AND TECHNIQUES," the entire specification of which is hereby incorporated by reference in its entirety for all purposes.

FIELD

Embodiments of the present disclosure generally relate to the field of wireless communication systems, and more particularly, to techniques and configurations for triggering a plurality of wireless devices such as, for example, Machine Type Communication (MTC) devices in a wireless communication network.

BACKGROUND

Mobile networks that facilitate transfer of information at broadband rates continue to be developed and deployed. Such networks may be colloquially referred to herein as broadband wireless access (BWA) networks. A variety of different device types may be used in broadband wireless technologies. Such devices may include, for example, personal computers, smart phone, laptops, netbooks, ultrabooks, tablets, handheld devices, and other consumer electronics such as music players, digital cameras, etc., that are configured to communicate over the wireless broadband networks.

Machine-to-Machine (M2M) may refer to technologies that allow wireless and wired systems to communicate with other devices without any human intervention. M2M may use a device such as, for example, a sensor or meter to collect information, which may be relayed through a network (e.g., wireless, wired, or hybrid) to an application that translates the information into meaningful data. The device may be, for example, a machine type communication (MTC) device configured to communicate with an MTC server in a BWA network. The expansion of BWA networks across the world and accompanying increased speed/bandwidth and reduced power of wireless communication has facilitated growth of M2M communication. Although the amount of data sent by MTC devices is very small, a large number of these devices, in combination, may increase a load on a network.

A user of the MTC devices may desire a poll model for communications between MTC devices and the MTC server in order to control communication from MTC devices and prevent random access of the MTC server by the MTC devices. Further, in some applications where MTC devices initiate communications, it may be desirable for the MTC server to poll data from the MTC devices. Current techniques for triggering a plurality of wireless devices (e.g., M2M devices) for transmission of small data payloads such as machine type communication (MTC) data may be inefficient or incompatible with emerging BWA networks.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Embodiments of the present disclosure provide techniques and configurations for triggering a plurality of wireless devices such as, for example, Machine Type Communication (MTC) devices in a wireless communication network. In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application-Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Example embodiments may be described herein in relation to broadband wireless access (BWA) networks including networks operating in conformance with one or more protocols specified by the 3$^{rd}$ Generation Partnership Project (3GPP) and its derivatives, the WiMAX Forum, the Institute for Electrical and Electronic Engineers (IEEE) 802.16 standards (e.g., IEEE 802.16-2005 Amendment), long-term evolution (LTE) project along with any amendments, updates, and/or revisions (e.g., advanced LTE project, ultra mobile broadband (UMB) project (also referred to as "3GPP2"), etc.). IEEE 802.16 compatible BWA networks are generally referred to as WiMAX networks, an acronym that stands for Worldwide Interoperability for Microwave Access, which is a certification mark for products that pass conformity and interoperability tests for the IEEE 802.16 standards. In other embodiments, communication schemes described herein may be compatible with additional/alternative communication standards, specifications, and/or protocols. For example, embodiments of the present disclosure may be applied to other types of wireless networks where similar advantages may be obtained. Such networks may include, but are not limited to, wireless local area networks (WLANs), wireless personal area networks (WPANs) and/or wireless wide area networks (WWANs) such as cellular networks and the like.

The following embodiments may be used in a variety of applications including transmitters and receivers of a mobile wireless radio system. Radio systems specifically included within the scope of the embodiments include, but are not limited to, network interface cards (NICs), network adaptors, base stations, access points (APs), relay nodes, enhanced node Bs, gateways, bridges, hubs and satellite radiotelephones. Further, the radio systems within the scope of embodiments may include satellite systems, personal communication systems (PCS), two-way radio systems, global positioning systems (GPS), two-way pagers, personal computers (PCs) and related peripherals, personal digital assistants (PDAs), personal computing accessories and all existing and future arising systems which may be related in nature and to which the principles of the embodiments could be suitably applied.

Figure 1:
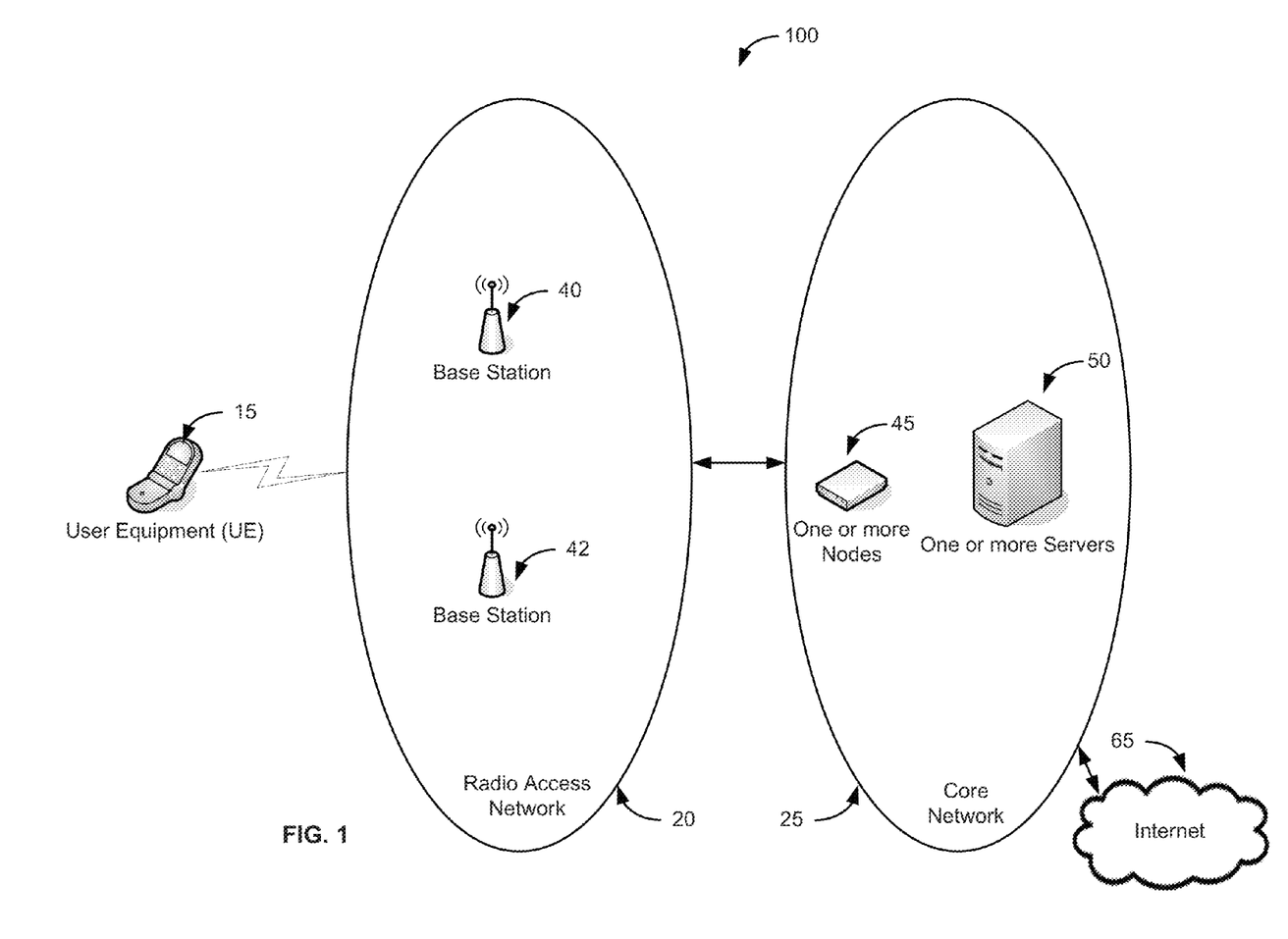
FIG. 1 schematically illustrates an example broadband wireless access (BWA) network in accordance with some embodiments.

FIG. 1 schematically illustrates an example broadband wireless access (BWA) network 100 in accordance with some embodiments. The BWA network 100 may include one or more radio access networks (hereinafter "RAN 20") and a core network 25. The BWA network 100 may be referred to more generally as a wireless communication network herein.

User Equipment (UE) 15 may access the core network 25 via a radio link ("link") with a base station (BS) such as, for example, one of base stations 40, 42, etc., in the RAN 20. The UE 15 may, for example, be a subscriber station that is configured to communicate with the base stations 40, 42 in conformance with one or more protocols. The following description is provided for an example BWA network 100 that conforms with 3GPP for ease of discussion, however, subject matter of the present disclosure is not limited in this regard and the described embodiments may apply to other wireless communication networks that benefit from the principles described herein.

In some embodiments, the base stations 40, 42 may include one or more Node Bs (also commonly denoted as evolved Node Bs, enhanced Node Bs, eNode Bs, or eNBs in 3GPP LTE), hereinafter "eNB station," and a UE 15 that is configured to communicate using a multiple-input and multiple-output (MIMO) communication scheme. The base stations 40, 42 may include one or more antennas, one or more radio modules to modulate and/or demodulate signals transmitted or received on an air interface, and one or more digital modules to process signals transmitted and received on the air interface. One or more antennas of the UE 15 may be used to concurrently utilize radio resources of multiple respective component carriers (e.g., which may correspond with antennas of base stations 40, 42) of the BWA network 100. The UE 15 may be configured to communicate using Orthogonal Frequency Division Multiple Access (OFDMA) in, e.g., downlink communications, and/or Single-Carrier Frequency Division Multiple Access (SC-FDMA) in, e.g., uplink communications in some embodiments.

In some embodiments, the UE 15 may be configured to communicate with another machine and be referred to as a machine type communication (MTC) device. The term MTC device refers to a device that is configured to communicate with another machine without the need for human interaction. For example, the MTC device may be configured to communicate with a server of the one or more servers 50. An MTC device may be as simple as a sensor that is electrically coupled to a wireless transceiver. The wireless transceiver may be configured to communicate with at least one of a WPAN, WLAN, and WWAN. The MTC device can vary from the simple device to a complex device such as a smart phone, a tablet computing device, or a wireless laptop which may be employed for machine to machine communication. The MTC device can include a mobile station, as defined by IEEE 802.16e (2005 or 802.16m (2009) or user equipment, as defined by 3GPP LTE Release 8 (2008), Release 9 (2009), or Release 10 (2011), commonly referred to as Rel. 8/9/10. The term MTC, as used herein, is also considered to be inclusive of the term "machine to machine" (M2M), which is considered to be synonymous with the term "MTC." In some embodiments, the UE 15 may represent a plurality or group of wireless devices (e.g., MTC devices) that are configured to establish communication with a server (e.g., MTC server of the one or more servers 50) in response to receiving a triggering indication from the server via the RAN 20.

While FIG. 1 generally depicts the UE 15 as a cellular phone, in various embodiments the UE 15 may be a personal computer (PC), a notebook, ultrabook, netbook, smart phone, an ultra mobile PC (UMPC), a handheld mobile device, an universal integrated circuit card (UICC), a personal digital assistant (PDA), a Customer Premise Equipment (CPE), a tablet, or other consumer electronics such as MP3 players, digital cameras, and the like.

In some embodiments, communication with the UE 15 via RAN 20 may be facilitated via one or more nodes 45. The one or more nodes 45 may serve as an interface between the core network 25 and the RAN 20. According to various embodiments, the one or more nodes 45 may include a Mobile Management Entity (MME) (e.g., SGSN/MME 58 of FIG. 2) that is configured to manage signaling exchanges (e.g., authentication of the UE 15) between the base stations 40, 42 and the core network 25 (e.g., one or more servers 50), a Packet Data Network Gateway (PGW) (e.g., GGSN/PGW 51 of FIG. 2) to provide a gateway router to the Internet 65, and/or a Serving Gateway (SGW) to manage user data tunnels or paths between the base stations 40, 42 of the RAN 20 and the PGW. Other types of nodes may be used in other embodiments.

The core network 25 may include logic (e.g., a module) to provide authentication of the UE 15 or other actions associated with establishment of a communication link to provide a connected state of the UE 15 with the BWA network 100. For example, the core network 25 may include one or more servers 50 that may be communicatively coupled to the base stations 40, 42. In an embodiment, the one or more servers 50 may include a Home Subscriber Server (HSS) (e.g., HLR/HSS 56 of FIG. 2), which may be used to manage user parameters such as a user's International Mobile Subscriber Identity (IMSI), authentication information, and the like. The core network 25 may include other servers, interfaces, and modules some of which are further described in connection with FIG. 2. The one or more servers 50 may include over-the-air (OTA) servers in some embodiments. In some embodiments, logic associated with different functionalities of the one or more servers 50 may be combined to reduce a number of servers, including, for example, being combined in a single machine or module.

According to various embodiments, the BWA network 100 is an Internet Protocol (IP) based network. For example, the core network 25 may be an IP based network. Interfaces between network nodes (e.g., the one or more nodes 45) may be based on IP, including a backhaul connection to the base stations 40, 42. In some embodiments, the BWA network 100 includes a Global System for Mobile Communication (GSM), General Packet Radio Service (GPRS), Universal Mobile Telecommunications System (UMTS), High Speed Packet Access (HSPA), Evolved HSPA (E-HSPA), or Long Term Evolution (LTE) network. In some embodiments, the RAN 20 may include GSM EDGE Radio Access Network (GERAN) where EDGE stands for Enhanced Data for GSM Evolution, Universal Terrestrial Radio Access Network (UTRAN), or Evolved UTRAN (E-UTRAN). The BWA network 100 may operate in accordance with other network technologies in other embodiments.

In an embodiment where the RAN 20 is a UTRAN, the base stations 40, 42 may represent eNB stations and/or Radio Network Controllers (RNCs), which are configured to communicate with the UE 15. In an embodiment where the RAN 20 is a GERAN, the base stations 40, 42 may represent a base station controller (BSC) configured to communicate with the UE 15 (e.g., a mobile station such as an MTC device) via a base transmission station (BTS).

A downlink (DL) transmission may be a communication from the base station (e.g., base station 40 or 42) to the UE 15 (e.g., MTC device), and an uplink (UL) transmission may be a communication from the UE 15 to the base station (e.g., base station 40 or 42).

Figure 2:
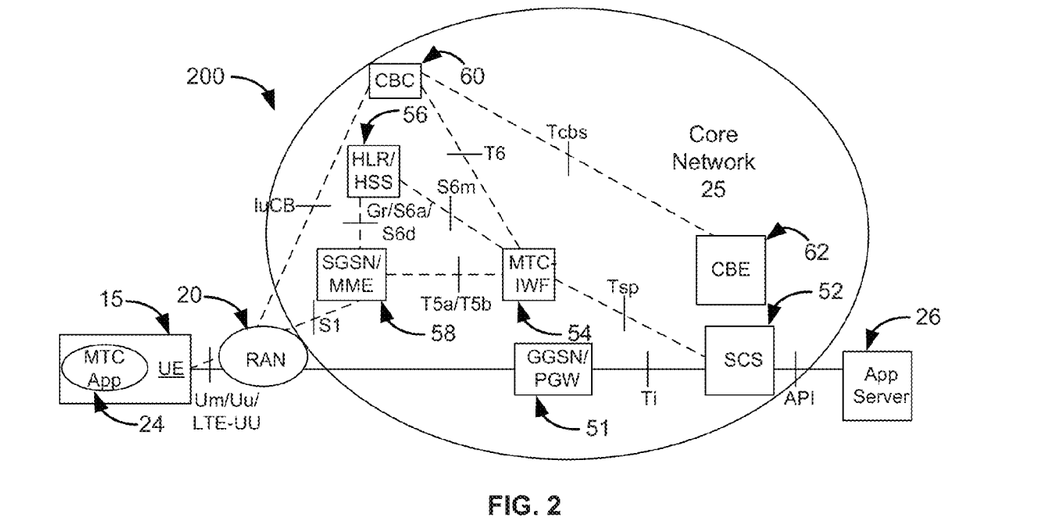
FIG. 2 schematically illustrates system architecture for triggering a plurality of wireless devices, in accordance with some embodiments.

FIG. 2 schematically illustrates system architecture 200 for triggering a plurality of wireless devices, in accordance with some embodiments. The system architecture 200 may be configured to efficiently communicate a triggering indication to a plurality of MTC devices in some embodiments. For example, user equipment (UE) 15 may include or be communicatively coupled with smart meters or sensors to collect small amounts of information for transmission (e.g., health monitoring devices, vending machines, and the like configured to collect information about temperature, inventory, etc.). The UE 15 may represent a plurality of MTC devices, each MTC device being configured to wirelessly communicate with the RAN 20 in some embodiments. In some embodiments, an Application server 26 may be configured to trigger the UE 15 to establish communication with a server of the core network 25. For example, the UE 15 may be triggered to send a data payload (e.g., MTC data payload including MTC information such as sensor or meter measurement, inventory level, etc.) to a Services Capability Server (SCS) 52. The data payload may be smaller than a preconfigured threshold to define a small data payload in some embodiments. The preconfigured threshold may be set by subscription or network operator policy in some embodiments.

According to various embodiments, the small data payload may be sent by the UE 15 to the SCS 52 or Application server 26 via RAN 20 and core network 25 or the small data payload may be sent by the Application server 26 or SCS 52 to the UE 15 via the core network 25 and the RAN 20. For example, the Application server 26 may be configured (e.g., by an MTC user) to send and/or trigger sending of a small data payload to user equipment (UE) 15. The Application server 26 may be communicatively coupled with the core network 25 using, for example, an Internet connection (e.g., Internet 65 of FIG. 1). In another example, an MTC application 24 that is communicatively or operatively coupled with the UE 15 may be configured to send or trigger the sending of a small data payload from the UE 15 to the SCS 52 and/or Application server 26. In some embodiments, the UE 15 is an MTC device configured to send or receive small data payloads and/or otherwise communicate with the MTC application 24. In some embodiments, the UE 15 may include the MTC application 24.

The system architecture 200 includes an SCS 52, which is configured to connect to the core network 25 to communicate with UEs (e.g., UE 15) that are configured for small data (e.g., MTC) communication. The SCS 52 may be further configured to communicate with an Interworking Function (IWF) such as MTC-IWF 54 to trigger a transmission of a small data payload. In some embodiments, the SCS 52 may be an MTC server or include an MTC server and an application server.

The MTC-IWF 54 may terminate a Tsp reference point or interface (hereinafter "reference point") between the SCS 52 and the MTC-IWF 54. The MTC-IWF 54 may be configured to hide internal public land mobile network (PLMN) topology and relay or translate signaling protocols used over the Tsp reference point to invoke specific functionality in the PLMN. In some embodiments, the MTC-IWF 54 may authenticate the SCS 52 before communication is established with the core network 25 and/or control plane requests from the SCS 52 are authorized. According to various embodiments, the dashed lines between modules (e.g., 54, 58) represent a control plane and the solid lines between modules represent a user plane. While a particular plane may be shown between modules, other embodiments may include additional or alternative planes.

In an embodiment, the MTC-IWF 54 may terminate a T5a/T5b reference point between a module including a Mobility Management Entity (MME) and/or a Serving GPRS (General Packet Radio Service) Support Node (SGSN) such as, for example, SGSN/MME 58. In some embodiments, the T5a reference point may terminate on the SGSN of the SGSN/MME 58 and the T5b reference point may terminate on the MME of the SGSN/MME 58. In another embodiment, the MTC-IWF 54 may terminate an S6m reference point between a module including a Home Location Register (HLR) and/or Home Subscriber Server (HSS) such as, for example, HLR/HSS 56.

According to various embodiments, the T5a/T5b reference point may be used to send control packet information to a network (e.g., a 3GPP PLMN) based on an indication from the SCS 52. The S6m reference point may be used to derive routing information for a downlink communication by obtaining an identifier (e.g., 3GPP internal device identifier such as IMSI or Mobile Station International Subscriber Directory Number (MSISDN)) from an MTC device identifier or MTC application identifier. In some embodiments, the MTC-IWF 54 may be configured to trigger a plurality of MTC devices (e.g., UE 15) by sending a paging message with a triggering indication to the plurality of MTC devices over the T5a/T5b reference point.

In an embodiment, the MTC-IWF 54 may terminate a T6 reference point between a Cell Broadcast Center (CBC) 60 and the MTC-IWF 54. The MTC-IWF 54 may be configured to trigger a plurality of MTC devices by sending a broadcast message to the plurality of MTC devices over the T6 reference point and an IuCB reference point between the CBC 60 and the RAN 20. The MTC-IWF 54 may perform functionality of a Cell Broadcast Entity (CBE) in some embodiments. In some embodiments, the MTC-IWF 54 may be used to format a Cell Broadcasting Service (CBS) message including, for example, splitting of a CBS message into a number of pages for broadcast transmission. Thus, a number of CBS messages may be broadcast in some embodiments. The MTC-IWF 54 may be configured to broadcast the CBS message through the CBC 60. For example, the MTC-IWF 54 may be configured send a broadcast message to MTC devices of an MTC group to trigger MTC devices of the MTC group to wake up, if in idle mode, and establish communication with the SCS 52 for small data transmission purposes.

In some embodiments, the CBC 60 may terminate a Tcbs reference point between a cell broadcast entity (CBE) 62 and the CBC 60. In some embodiments, a triggering message may be sent by the CBE 62 to the CBC 60 over the Tcbs reference point. For example, the CBE 62 may be collocated or implemented as part of the SCS 52 in some embodiments. In this regard, the CBC 60 may terminate a reference point between the SCS 52 (e.g., including the CBE 62) and the CBC 60.

The system architecture 200 may further include Gr/S6a/S6d reference points between the HLR/HSS 56 and the SGSN/MME 58, reference point Ti between the SCS 52 and the GGSN/PGW 51, reference point Application Programming Interface (API) between the Application server 26 and the SCS 52, reference point S1 between the SGSN/MME 58 and the RAN 20, and reference points Um/Uu/LTE-UU between the RAN 20 and the UE 15. The reference points are not limited to the example names provided and may be referred to by other names in other embodiments. The system architecture 200 may include other reference points in other embodiments.

The system architecture 200 may support triggering of a plurality of MTC devices for transmission of small data payloads with reduced network impact such as signaling overhead, network resources, or delay for reallocation. In some embodiments, one or more MTC devices of the plurality of MTC devices (e.g., UE 15) may be attached (e.g., by an established Radio Resource Control (RRC) connection) or detached from the RAN 20 when a triggering indication is sent by the MTC-IWF 54 to the plurality of MTC devices. Further, one or more MTC devices of the plurality of MTC devices (e.g., UE 15) may be in connected mode or idle mode when the triggering indication is sent by the MTC-IWF 54 to the plurality of MTC devices in some embodiments.

As a number of MTC devices increase, one challenge is dealing with a large number of MTC devices that all attempt to communicate at approximately the same time. For example, a large utility company may use MTC devices to wirelessly report a utility usage value for each customer via a WWAN. If a transmission station sends a request for data over a large area, tens of thousands of MTC devices may simultaneously attempt to connect to the RAN 20 and communicate the designated data. Obviously, this can inundate the RAN 20 and potentially keep the MTC devices from reporting.

One way of dealing with a potential inundation of communication from a large number of MTC devices is to divide MTC devices into groups. Each MTC device can be assigned a value corresponding with the group (e.g., group identification (ID) value). The group ID values may be assigned by a user or a manufacturer. Alternatively, the group ID value may be based on another value, such as an Internet address or media access control (MAC) address. The group ID value may be static. Alternatively, the group ID value may be dynamic, allowing the value to be assigned or changed remotely when it is needed or desired. For example, if a group becomes too large, some members of the group can be assigned to another group to average out the load on the RAN when MTC devices in the groups communicate.

When each MTC device is assigned a group ID value, a selected number of MTC devices can be designated to communicate at a given time. The communication can involve establishing a connection between the MTC device and the RAN 20. The communication may also involve receiving data from the RAN 20 at the MTC device or sending data from an MTC device to the RAN 20.

For many MTC applications, a poll type model may be used to enable communication between MTC devices and a machine, such as a server (e.g., SCS 52) designated to communicate with the MTC devices, which may be referred to as an MTC server in some embodiments. In a poll type model, the SCS 52 can poll the MTC devices to communicate. When a poll type model is used, the MTC devices may be configured so that they will not communicate without being triggered by the SCS 52.

There are many advantages to the use of a poll type model for communicating with MTC devices. For instance, an MTC user (e.g., a transportation management company) can be in control of communication from the MTC devices. The MTC devices will not randomly access the SCS 52. This allows a communication timeline to be designed to reduce the chances of the RAN being inundated with MTC device traffic. Also, for applications where MTC devices typically initiate communications, there may still be an occasional need for an SCS 52 to poll data from the MTC devices. Accordingly, in one embodiment, a group ID value can be used to trigger selected MTC devices to communicate with an SCS 52.

In one embodiment, a trigger can be communicated from an SCS 52 to selected MTC devices via a RAN 20 using CBS. Particularly, in systems configured to operate based on a GERAN or UTRAN specification, hereby referred to as a GERAN or UTRAN system, CBS can be configured to communicate a trigger indication to a plurality of MTC devices that includes a group ID value via a RAN 20.

In some embodiments, the CBS may be configured to communicate a trigger indication that includes a group ID value to a plurality of MTC devices via a RAN 20. Each MTC device can include an MTC application (e.g., MTC application 24) that recognizes one or more MTC group ID values. As previously discussed, the MTC group ID value of each MTC device may be static or dynamic. In this example, a communication from an SCS 52 can be sent on the control plane to a cell broadcast center (CBC) 60 via MTC-IWF 54.

According to various embodiments, the Tsp reference point can be used to connect the MTC-IWF 54 to one or more MTC servers (e.g., SCS 52). The Tsp reference point can support the reception of a device trigger request from the SCS 52, report to the SCS 52 the acceptance or non-acceptance of the device trigger request, report to the SCS 52 the success or failure of a device trigger delivery; and provide congestion/load control information to the SCS 52 as part of the response to trigger requests. The Tsp reference point can also provide optional security and privacy protection for communication between the MTC-IWF 54 and the SCS 52. The Tsp reference point may be a reference point an entity outside the 3GPP network uses to communicate with the MTC-IWF 54 related control plane signaling to connect the SCS 52 with a WWAN network, such as a 3GPP network, including a UTRAN based network and a GERAN based network.

Figure 3:
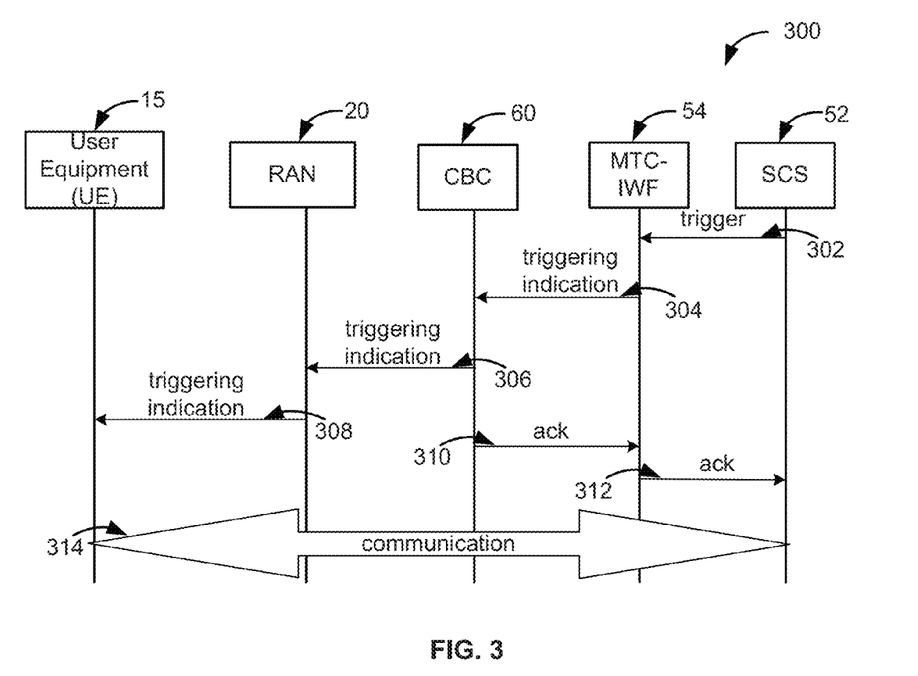
FIG. 3 schematically illustrates an example scheme for triggering a plurality of wireless devices, in accordance with some embodiments.

FIG. 3 schematically illustrates an example scheme 300 for triggering a plurality of wireless devices, in accordance with some embodiments. The example scheme 300 may be used, for example, where the RAN 20 includes a UTRAN or GERAN.

Referring to FIGS. 2 and 3, at 302, the SCS 52 may send a trigger to the MTC-IWF 54 to trigger communication between the SCS 52 and a plurality of MTC devices (e.g., UE 15). The SCS 52 may send a triggering message that includes MTC device identification (ID), group ID, and/or an MTC application ID in the triggering message to indicate a plurality of target UEs (e.g., UE 15) to receive a triggering indication. The SCS 52 may further include in the message, or otherwise send, a small data payload to the MTC-IWF 54 for transmission to the plurality of target UEs in some embodiments. In other embodiments, an Application server 26 may directly send the triggering message to the MTC-IWF 54. In some embodiments, a secure connection may be established between the MTC-IWF 54 and the SCS 52 for transmissions at 302 over the Tsp reference point.

At 304, the MTC-IWF 54 may send a triggering indication to the CBC 60 over the T6 reference point in response to receiving the trigger at 302. In some embodiments, the MTC-IWF 54 may send a broadcast message (e.g., CBS message) including the triggering indication to the CBC 60 for the CBC 60 to forward to a plurality of MTC devices. For example, the MTC-IWF 54 may perform the functionality of a CBE and format the CBS message (e.g., split the CBS message into a number of pages) for broadcast transmission to the plurality of MTC devices. The CBS message may further include information that identifies target MTC devices that are to receive the broadcast transmission.

Alternatively, instead of actions at 302 and 304, the SCS 52 may be configured to send, at 302, a triggering indication to the CBC (e.g., over reference point Tcbs). The CBE 62, in such embodiment, may be collocated or implemented as part of the SCS 52 and configured to send a broadcast message (e.g., CBS message including the triggering indication to the CBC 60 for the CBC 60 to forward to a plurality of MTC devices. For example, the SCS 52 may perform the functionality of the CBE 62 and format the CBS message (e.g., split the CBS message into a number of pages) for broadcast transmission to the plurality of MTC devices. The CBS message may further include information that identifies target MTC devices that are to receive the broadcast transmission.

At 306, the CBC 60 may send, in response to the triggering indication received at 304 or 305, the triggering indication over reference point IuCB to the RAN 20 for transmission of the triggering indication to the plurality of MTC devices. For example, the CBC 60 may send or forward the CBS message to the RAN 20. In embodiments where the RAN 20 is a GERAN, the RAN 20 may include a Base Station Controller (BSC) and a Base Transceiver System (BTS). In such embodiments, the CBC 60 may send a WRITE-REPLACE message including the triggering indication to the BSC for broadcast. The CBC may perform the broadcast by determining a set of cells to which the CBS message should be broadcast and sending the CBS message (e.g., fixed length CBS messages) to the BTS of the RAN 20 via the BSC.

Table 1 depicts example content of a WRITE-REPLACE message that is configured to indicate triggering of a plurality of MTC devices in a GERAN. The WRITE-REPLACE message may include values for information element (IE), reference, type, and length, as can be seen. The type field includes values to indicate whether presence of the information element is mandatory (M), optional (O) or conditional (C). The length field includes values to indicate a size or length in octets of the information element. The WRITE-REPLACE message may include a message identifier IE as described herein (e.g., message identifier IE 400 of FIG. 4).

TABLE 1

Example Content of a WRITE-REPLACE Message in GERAN

| INFORMATION ELEMENT | REFERENCE | TYPE | LENGTH |
|---|---|---|---|
| Message Type | 8.2.2 | M | 1 |
| Length Indicator | 8.2.26 | M | 3 |
| Message Identifier | 8.2.16 | M | 3 |
| New Serial Number | 8.2.5 | M | 3 |
| Old Serial Number | 8.2.4 | O | 3 |
| Cell List | 8.2.6 | M | 4 + m to 4 + mn |
| Channel Indicator | 8.2.20 | O (note 1) | 2 |
| Category | 8.2.7 | C (note 2) | 2 |
| Repetition Period | 8.2.8 | C (note 2) | 3 |
| Number of Broadcasts Requested | 8.2.9 | C (note 2) | 3 |
| Number of Pages | 8.2.21 | C (note 2) | 2 |
| Data Coding Scheme | 8.2.14 | C (note 2) | 2 |
| Message Content (Page 1) | 8.2.3 | C (note 2) | 84 |
| Message Content (Page 2) | 8.2.3 | O | 84 |
| Message Content (Page 3) | 8.2.3 | O | 84 |
| Message Content (Page 4) | 8.2.3 | O | 84 |
| Message Content (Page 5) | 8.2.3 | O | 84 |
| Message Content (Page 6) | 8.2.3 | O | 84 |
| Message Content (Page 7) | 8.2.3 | O | 84 |
| Message Content (Page 8) | 8.2.3 | O | 84 |
| Message Content (Page 9) | 8.2.3 | O | 84 |
| Message Content (Page 10) | 8.2.3 | O | 84 |
| Message Content (Page 11) | 8.2.3 | O | 84 |
| Message Content (Page 12) | 8.2.3 | O | 84 |
| Message Content (Page 13) | 8.2.3 | O | 84 |
| Message Content (Page 14) | 8.2.3 | O | 84 |
| Message Content (Page 15) | 8.2.3 | O | 84 |
| Emergency Indicator | 8.2.17 | O (note 1) | 2 |
| Warning Type | 8.2.18 | C (note 3) | 3 |
| Warning Security Information | 8.2.19 | C (note 3) | 51 |
| Warning Period | 8.2.25 | C (note 3) | 2 |
| Trigger Indicator | | O (note 1) | 2 |
| Trigger-SmallData Information | | O | 1024 |

(note 1): Only one of these three optional IEs shall be present in the message. Channel Indicator IE is included if and only if the message contains a CBS message. Emergency Indicator IE is included if and only if the message contains an emergency message. Trigger Indicator IE may be included if and only if the message contains an MTC trigger message.
(note 2): This IE is included if and only if the Channel Indicator IE is present in the message.
(note 3): This IE is included if and only if the Emergency Indicator IE is present in the message and the Emergency Indicator IE indicates ETWS information.

Figure 4:
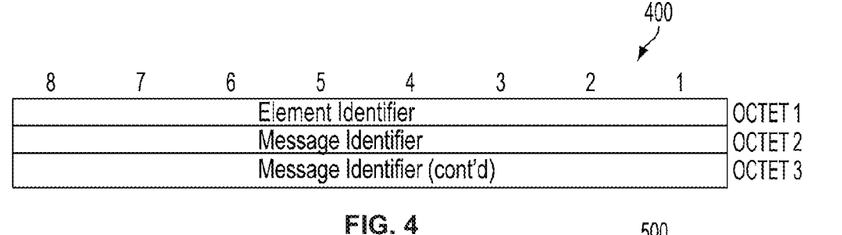
FIG. 4 schematically illustrates a message identifier information element (IE), in accordance with some embodiments.

Referring briefly to FIG. 4, a message identifier information element (IE) 400 is schematically illustrated, in accordance with some embodiments. The message identifier IE 400 may be used to identify a source and type of CBS message. The message identifier IE 400 may include one or more bits to indicate features of the message identifier IE 400. For example, in some embodiments, the message identifier IE 400 may include a first octet (octet 1) of eight bits to indicate an element identifier and a second octet (octet 2) and third octet (octet 3) to indicate a message identifier. The message identifier IE 400 may be configured with other allocations of bits to indicate features of the message identifier IE 400 in other embodiments.

The message identifier IE 400 may include values in the message identifier field that indicate group triggering of MTC devices. For example, the message identifier field may include values ranging in Decimal from 6401-40959 and in Hex from 1901-9FFF. If a message identifier value within these ranges is in a "search list," a UE 15 shall attempt to receive the CBS message. A message identifier value may be assigned for group triggering of MTC devices within the Hex range of 1901-9FFF. In some embodiments, a message identifier having a value of 6401 indicates an MTC Trigger CBS message and a message identifier having a value of 6402 indicates a Small Data CBS message. The message identifier may have other values that indicate a Group CBS message. The message identifier may have other values to indicate MTC triggering and/or small data transmission in other embodiments.

In some embodiments, the UE 15 may be configured to receive the CBS message if the message identifier in the CBS message matches a message identifier in a "search list" stored local to the UE 15. The "search list" may include, for example, message identifiers stored in Cell Broadcast Message Identifier files (e.g., EFCBMI, EFCBMID, or EFCBMIR files) on a subscriber identity module (SIM) of the UE 15. For example, the UE 15 may be configured to receive a CBS message with a message identifier that indicates an MTC trigger, small data, and/or group CBS message in the search list and discard a CBS message with a message identifier that is not in the search list.

Returning to Table 1 and FIGS. 2 and 3, a priority of the trigger may be indicated in a category information element (IE) of the WRITE-REPLACE message. For example, the category IE may have a value that indicates High Priority, Background, or Normal priority. High Priority may indicate that the trigger be broadcast at the earliest opportunity. Background priority may indicate that the trigger be broadcast when no CBS messages of category High Priority or Normal is broadcast. A repetition period may define a minimum broadcast requirement. Normal priority may indicate that the trigger be broadcast according to the associated repetition period. If a category IE is omitted, a default category of Normal may be applied to the CBS message.

Figure 5:
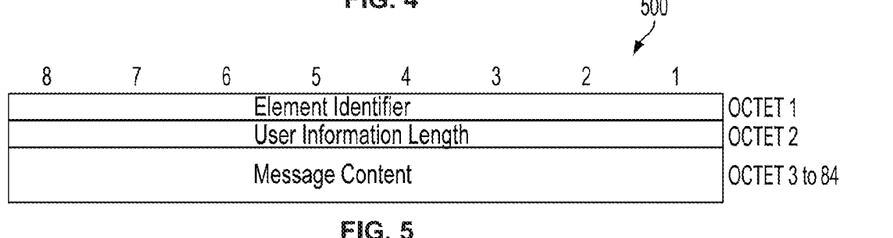
FIG. 5 schematically illustrates a message content information element (IE), in accordance with some embodiments.

The WRITE-REPLACE message may further include a message content information element (IE). Referring briefly to FIG. 5, a message content information element (IE) 500 is schematically illustrated, in accordance with some embodiments. The message content IE 500 may include one or more bits to indicate features of the message content IE 500. For example, in some embodiments, the message content IE 500 may include a first octet (octet 1) of eight bits to indicate an element identifier, a second octet (octet 2) to indicate user information length, and third octet (octet 3) for message content. The message content IE 500 may be configured with other allocations of bits to indicate features of the message content IE 500 in other embodiments. The message content may include information to identify a UE (e.g., UE identifier), an MTC trigger, and/or small data payload in some embodiments.

Figure 6:
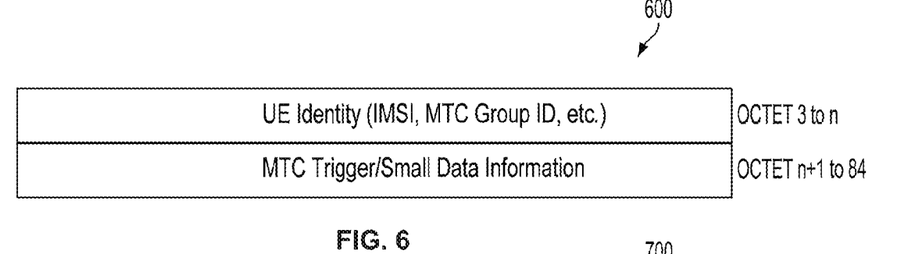
FIG. 6 schematically illustrates example message content of the message content information element (IE), in accordance with some embodiments.

Referring briefly to FIG. 6, example message content 600 of the message content IE 500 of FIG. 5 is schematically illustrated, in accordance with some embodiments. The message content 600 may include octet 3 to n for UE identity and octet n+1 to 84 for MTC trigger and/or small data information, where n represents an integer. The UE identity may include any suitable UE identifier such as, for example, IMSI, MTC Group ID, and the like. User information (e.g., UE identifier) of the message content IE 500 of FIG. 5 may be broadcast over the RAN 20 together with a serial number, message identifier and data coding scheme in some embodiments.

The UE Identity may be used by the UE 15 to determine if the UE 15 belongs to an MTC group targeted by the CBS message. For example, if the UE 15 belongs to a plurality of MTC devices targeted by the CBS message, the UE 15 may respond to the CBS message (e.g., establish a connection with the wireless communication network and communicate with the SCS 52). If the UE 15 does not belong to the plurality of MTC devices targeted by the CBS message, the UE 15 may ignore the CBS message.

The format of the message content 600 may depend on a value of the message identifier in the message identifier IE 400 of FIG. 4. For example, the message content 600 may include an MTC trigger when an MTC trigger CBS message is indicated in the message identifier or may include a small data payload when a small data CBS message is indicated in the message identifier. In either case, the UE may be triggered to establish communication with the wireless communication network.

Returning again to Table 1 and FIGS. 2 and 3, in one embodiment, the CBC 60 may send, at 306, a WRITE-REPLACE message having a message identifier IE (e.g., message identifier IE 400) that indicates group triggering of MTC devices (e.g., Message Id 6401 or 6402 respectively corresponding with MTC Trigger CBS Message or Small Data CBS Message) and the message content IE (e.g., message content IE 500 of FIG. 5) may include triggering information such as, for example, the MTC trigger and/or small data. Information of the MTC trigger or small data may be sent in another information element in other embodiments. For example, in another embodiment, the CBC 60 may send a WRITE-REPLACE message having a message identifier that indicates group triggering of MTC devices and further including a trigger indicator information element (IE) (e.g., trigger indicator IE 700 of FIG. 7) for a trigger indicator and/or a trigger-small data information IE (e.g., trigger-small data information IE 800 of FIG. 8) for trigger small data information. The trigger indicator IE or the trigger-small data information IE may be included only if the WRITE-REPLACE message contains an MTC trigger message.

Figure 7:
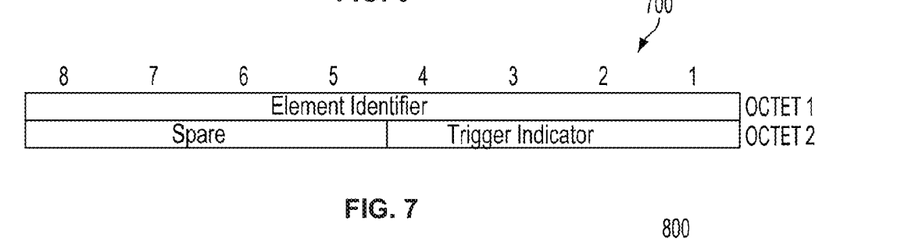
FIG. 7 schematically illustrates a trigger indicator information element (IE), in accordance with some embodiments.

Referring briefly to FIG. 7, a trigger indicator IE 700 is schematically illustrated, in accordance with some embodiments. The trigger indicator IE 700 may include one or more bits to indicate features of the trigger indicator IE 700. For example, in some embodiments, the trigger indicator IE 700 may include a first octet (octet 1) of eight bits to indicate an element identifier and a second octet (octet 2) where a first four bits of the second octet are used for a trigger indicator and a second four bits of the second octet are spare. The trigger indicator IE 700 may be configured with other allocations of bits to indicate features of the trigger indicator IE 700 in other embodiments.

Figure 8:
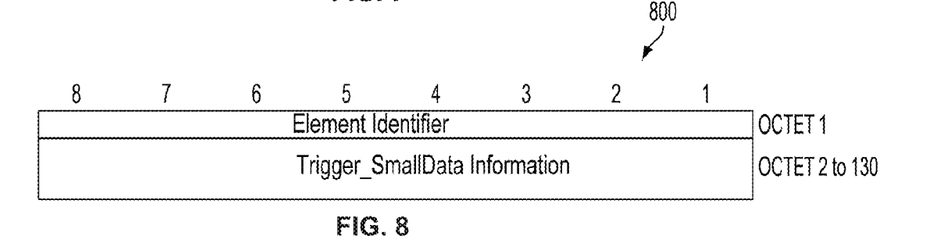
FIG. 8 schematically illustrates a trigger-small data information element (IE), in accordance with some embodiments.

Referring briefly to FIG. 8, a trigger-small data information IE 800 is schematically illustrated, in accordance with some embodiments. The trigger-small data information IE 800 may include one or more bits to indicate features of the trigger-small data information IE 800. For example, in some embodiments, trigger-small data information IE 800 may include a first octet (octet 1) of eight bits to indicate an element identifier and a second octet (octet 2) up to octet 130 for trigger small data information. The trigger-small data information IE 800 may be configured with other allocations of bits to indicate features of the trigger-small data information IE 800 in other embodiments.

Returning again to Table 1 and FIGS. 2 and 3, in an embodiment where the RAN 20 is a GERAN, the BSC may broadcast the CBS message received from the CBC at 306 within a cell broadcast area in accordance with one or more cells indicated in a cell identifier field in a cell list information element (IE). The BSC may route the CBS message to each appropriate BTS corresponding with the one or more cells for broadcast transmission via a sequence of either four Short Message Service (SMS) broadcast request messages or one SMS broadcast command message.

Table 2 depicts example content of an SMS broadcast request message. The SMS broadcast request message may include values for information element (IE), reference, presence, format, and length, as can be seen. The presence field includes values to indicate whether presence of the information element is mandatory (M) or optional (O). The format field includes values to indicate Value only (V) or Type and Value (TV). The length field includes values to indicate a size or length in octets of the information element. The SMS broadcast request message may include a Short Message Service Cell Broadcast (SMSCB) information IE as described herein (e.g., SMSCB information IE 900 of FIG. 9).

TABLE 2

Example Content of an SMS Broadcast Request Message

| INFORMATION ELEMENT | REFERENCE | PRESENCE | FORMAT | LENGTH |
|---|---|---|---|---|
| Message discriminator | 9.1 | M | V | 1 |
| Message type | 9.2 | M | V | 1 |
| Channel number | 9.3.1 | M | TV | 2 |
| SMSCB Information | 9.3.36 | M | TV | 24 |
| SMSCB Channel Indicator | 9.3.44 | O 1) | TV | 2 |

Figure 9:
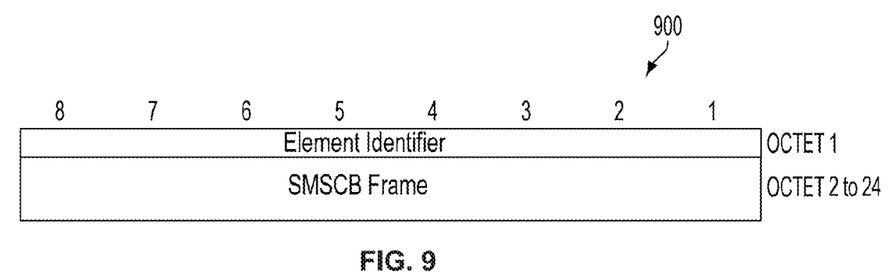
FIG. 9 schematically illustrates a Short Message Service Cell Broadcast (SMSCB) information element (IE), in accordance with some embodiments.

FIG. 9 schematically illustrates an SMSCB information IE 900, in accordance with some embodiments. The SMSCB information IE 900 may include one or more bits to indicate features of the SMSCB information IE 900. For example, in some embodiments, SMSCB information IE 900 may include a first octet (octet 1) of eight bits to indicate an element identifier and a second octet (octet 2) up to octet 24 for SMSCB frame. The SMSCB information IE 900 may be configured with other allocations of bits to indicate features of the SMSCB information IE 900 in other embodiments.

Table 3 depicts example content of an SMS broadcast command message. The SMS broadcast command message may include values for information element (IE), reference, presence, format, and length, as can be seen. The presence field includes values to indicate whether presence of the information element is mandatory (M) or optional (O). The format field includes values to indicate Value only (V), Type and Value (TV), or Type, Length, and Value (TLV). The length field includes values to indicate a size or length in octets of the information element. The SMS broadcast command message may include a Short Message Service Cell Broadcast (SMSCB) message IE as described herein (e.g., SMSCB message IE 1000 of FIG. 10).

TABLE 3

Example Content of an SMS Broadcast Command Message

| INFORMATION ELEMENT | REFERENCE | PRESENCE | FORMAT | LENGTH |
|---|---|---|---|---|
| Message discriminator | 9.1 | M | V | 1 |
| Message type | 9.2 | M | V | 1 |
| Channel number | 9.3.1 | M | TV | 2 |
| CB Command type | 9.3.41 | M | TV | 2 |
| SMSCB message | 9.3.42 | M | TLV | 2-90 |
| SMSCB Channel Indicator | 9.3.44 | O 1) | TV | 2 |

Figure 10:
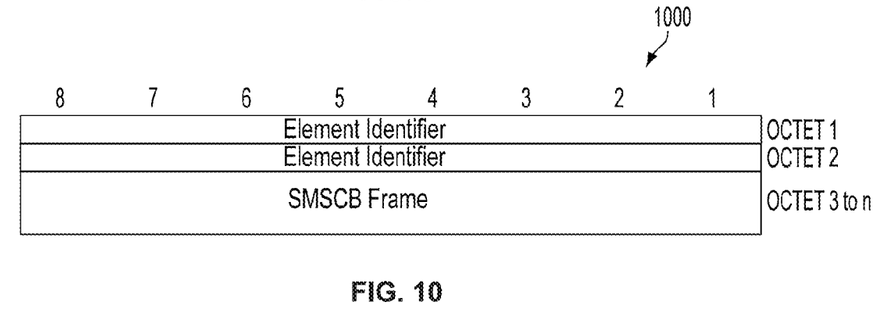
FIG. 10 schematically illustrates a SMSCB message information element (IE), in accordance with some embodiments.

FIG. 10 schematically illustrates an SMSCB message IE 1000, in accordance with some embodiments. The SMSCB message IE 1000 may include one or more bits to indicate features of the SMSCB message IE 1000. For example, in some embodiments, SMSCB message IE 1000 may include a first octet (octet 1) of eight bits to indicate an element identifier, a second octet (octet 2) to indicate a length, and octet 3 to n for SMSCB message. The SMSCB message IE 1000 may be configured with other allocations of bits to indicate features of the SMSCB message IE 1000 in other embodiments.

An SMS broadcast request message (Table 2) may be sent from the BSC to the BTS to request the sending of an SMS cell broadcast message. An SMSCB IE can be used (e.g., SMSCB information IE 900 of FIG. 9). The SMSCB IE may include the complete information to be broadcast on a cell broadcast channel (CBCH), including a Layer 2 header that can be used on the radio path. The broadcast request message may include an SMSCB channel indicator IE that indicates the CBCH which can be used for broadcasting the data. If an SMSCB channel indicator IE is not present then a default CBCH can be used.

An SMS broadcast command message (Table 3) may be sent from the BSC to the BTS to command an SMS cell broadcast (CB) to be sent. The broadcast command message may include a CB command type IE that includes a command to be performed, allowing the BSC to request immediate broadcast (e.g., transmit in the next CBCH opportunity) and set the BTS broadcast to default mode. The SMSCB message IE may include the message information to be broadcast on the CBCH.

The SMSCB channel indicator IE may indicate the CBCH that is used for broadcasting the data. If the SMSCB channel indicator IE is not present then a default CBCH can be used. The BTS may be configured to perform segmentation and/or build block types and padding if necessary. The SMS broadcast command message may be sent to the BTS, which may segment the message into a sequence of 4 blocks that are each 22 octets long. Each page of a CBS message received by the BTS that is to be sent over the air to the MTC device (e.g., UE 15 of FIG. 2) may correspond with a block of 88 octets. The BTS may be configured to segment each 88 octet block into four 22 octet blocks for over the air transmission to the MTC device. The BTS may be configured to add a 1 octet block type as a header to each 22 octet block to provide a block for transmission that is 23 octets in length.

Returning again to FIGS. 2 and 3, at 308, the BTS of the RAN 20 may broadcast the CBS message received from the CBC 60 including the triggering indication to a plurality of MTC devices. Table 4 depicts example content of a CBS message sent by the BTS to the plurality of MTC devices. The content of the CBS message may include octet numbers 1-2 for a serial number, octet numbers 3-4 for a message identifier, octet number 5 for a data coding scheme, octet 6 for a page parameter and octets 7-88 for content of the message (e.g., the triggering indication or other triggering information).

TABLE 4

Example Content of a CBS Message sent by BTS

| Octet Number(s) | Field |
|---|---|
| 1-2 | Serial Number |
| 3-4 | Message Identifier |
| 5 | Data Coding Scheme |
| 6 | Page Parameter |
| 7-88 | Content of Message |

The BTS may be configured to transmit the CBS message via a base transmission station-mobile station (BTS-MS) interface in some embodiments. In some embodiments, the mobile station may be an MTC device.

In one embodiment, a trigger message (e.g., CBS message of Table 4) sent over a BSC-BTS interface and the BTS-MS interface can be extended further to carry additional information in a transparent data container. For instance, an MTC group ID value can be included in the transparent data container. The information in the transparent data container, such as the MTC group ID value, can be directly interpreted by the MTC device. The MTC device can use this information to determine if it belongs to the MTC group identified by the MTC group ID value. Based on the information in the transparent data container, the MTC device can determine whether or not to respond back to the trigger. Alternatively, the trigger message itself can be enhanced to carry the MTC group ID value that can be used to enable an MTC device to respond to trigger messages containing a selected group ID value. The MTC device may respond to trigger messages that contain the same group ID value as the MTC device.

In another embodiment, the transparent data container and/or the trigger message can include a plurality of different MTC group ID values. This allows an MTC server (e.g., SCS 52 of FIG. 2) to request communication with devices in more than one group. In addition, one or more MTC group ID values can be attached to another type of message. The MTC device can be configured to read each MTC group ID value in the message and/or transparent data container. If one of the MTC group ID values is the same as the MTC device then the MTC device may respond to the trigger message.

In embodiments where the RAN 20 is a UTRAN, the CBC 60 may be configured to send, at 306, the triggering indication to a radio network controller (RNC) of the RAN 20 (e.g., the triggering indication may be sent in a CBS message formatted as a WRITE-REPLACE message). On a CBC-RNC interface, a CBS message may be uniquely identified by a combination or triplet of message identifier, serial number and cell identifier. Table 5 depicts example content of a WRITE-REPLACE message in a UTRAN that is sent by the CBC 60 to the RNC of the RAN 20. The WRITE-REPLACE message may include values for parameter, presence, IE type and reference, criticality, and assigned criticality, as can be seen. The presence field includes values to indicate whether presence of the information element is mandatory (M) or optional (O). The message identifier and broadcast message content parameters (e.g., IEs) of the WRITE-REPLACE message of Table 5 may be similar or otherwise comport with embodiments described in connection with respective message identifier IE 400 of FIG. 4 and message content IE 500 of FIG. 5 for the GERAN. That is, the broadcast message content parameter may include user information (e.g., the CBS message including the triggering indication and/or information) for broadcast over the RAN 20 to a plurality of MTC devices.

TABLE 5

Example Content of a WRITE-REPLACE message

| PARAMETER | PRESENCE | IE Type and Reference | Criticality | Assigned Criticality |
|---|---|---|---|---|
| Message Type | M | 9.2.1 | yes | reject |
| Message Identifier | M | 9.2.19 | yes | reject |
| New Serial Number | M | 9.2.5 | yes | reject |
| Old Serial Number | O | 9.2.4 | yes | ignore |
| Service Areas List | M | 9.2.6 | yes | reject |
| Category | O | 9.2.7 | yes | ignore |
| Repetition Period | M | 9.2.8 | yes | reject |
| Number of Broadcasts Requested | M | 9.2.9 | yes | reject |
| Data Coding Scheme | M | 9.2.15 | yes | reject |
| Broadcast Message Content | M | 9.2.2 | yes | reject |
| Warning Security Information | O | 9.2.23 | yes | ignore |
| Paging ETWS Indicator | O | 9.2.21 | yes | ignore |
| Warning Type | O | 9.2.22 | yes | ignore |
| Broadcast Message Content Validity Indicator | O | 9.2.24 | yes | ignore |

In embodiments where the RAN 20 is a UTRAN, the triggering indication sent, at 308, by the RNC of the RAN to the plurality of MTC devices may be in a CBS message format as depicted in Table 6. Table 6 depicts example content of the CBS message sent by the RNC to a plurality of MTC devices (e.g., by way of one or more transmitting nodes such as eNB stations). The content of the CBS message may include octet numbers 1 for message type, octet numbers 2-3 for a message identifier, octet numbers 4-5 for a serial number, octet 6 for a data coding scheme and octets 7-n for cell broadcast (CB) data (e.g., the triggering indication or other triggering information).

TABLE 6

Example Content of a CBS Message sent by RNC

| Octet Number(s) | Parameter |
|---|---|
| 1 | Message Type |
| 2-3 | Message ID |
| 4-5 | Serial Number |
| 6 | Data Coding Scheme |
| 7-n | CB Data |

The CB data of the CBS message depicted in Table 6 may include WRITE-REPLACE primitive parameters received from the CBC 60. Table 7 depicts an example format of the primitive parameters, as can be seen.

TABLE 7

Example Format of Primitive Parameters in CB data

| Octet Number(s) | Parameter |
|---|---|
| 1 | Number-of-Pages |
| 2-83 | CBS-Message-Information-Page 1 |
| 84 | CBS-Message-Information-Length 1 |
| ... | ... |
|  | CBS-Message-Information-Page n |
|  | CBS-Message-Information-Length n |

NOTE:
n equal to or less than 15

The RNC may format and send as a single SMS broadcast command to the plurality of MTC devices (e.g., UE 15) in response to receiving the triggering indication, at 306, from the CBC. In a UTRAN system, the CBS message sent by the RNC to the UE 15 may be completely transparent to the transmitting node (e.g., Node B or eNB station). That is, no manipulation of data such as a fragmentation of data may be performed at the transmitting node in some embodiments. The CBS message may be transmitted as one unit over a radio interface to the plurality of MTC devices. A logical channel CTCH on Layer 2 of a UMTS radio interface may be used to transmit the CBS message (e.g., of Table 6) to the plurality of MTC devices.

In one embodiment, messages sent over an RNC-UE interface can be extended further to be carried as a transparent data container. As previously discussed, one or more group ID values can be placed in the transparent data container. The information carried in the transparent data container can be directly interpreted by the UE 15 to determine if the UE 15 belongs to a particular MTC group. Based on that information, the UE 15 can communicate a response to the trigger back to the RNC at the RAN 20. Alternatively, the trigger message can be enhanced to carry an MTC group ID that can be used to identify a UE 15 belonging to the same group identified by the MTC group ID. Another alternative is to define a new message for group triggering of MTC devices with a new set of action codes in the RAN 20.

In both the GERAN and UTRAN, a new control message can be introduced to provide, at 310 and 312, an acknowledgement of the trigger from the CBC 60 back to the MTC server (e.g., SCS 52). The acknowledgement can be communicated through the MTC-IWF 54 to allow for formatting of the acknowledgement to a desired format that is usable by the MTC server. The UE 15 may be configured to establish communication, at 314, with the SCS 52 in response to receiving the triggering indication at 308. The communication may be established between the UE 15 and the SCS 52 for transmission of a small data payload (e.g., MTC data payload) from the UE 15 to the SCS 52 and/or from the SCS 52 to the UE 15.

Figure 11:
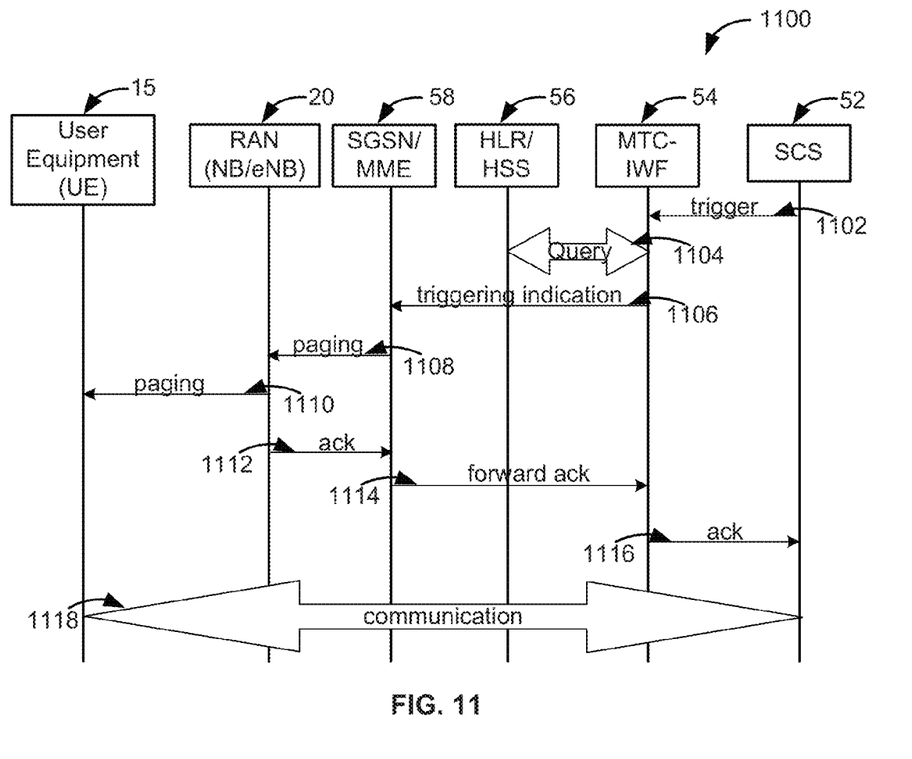
FIG. 11 schematically illustrates another example scheme for triggering a plurality of wireless devices, in accordance with some embodiments.

In some embodiments, a triggering indication to trigger a plurality of MTC devices may be sent in a paging message over the T5a/T5b reference point. FIG. 11 schematically illustrates another example scheme 1100 for triggering a plurality of wireless devices, in accordance with some embodiments. The techniques of FIG. 11 may be used, for example, where the RAN 20 is a UTRAN or E-UTRAN.

Referring to FIGS. 2 and 11, at 1102, the SCS 52 may send a message to the MTC-IWF 54 to trigger transmission of a small data payload. The SCS 52 may include an MTC device identification (ID), MTC Group ID, and/or an MTC application (e.g., MTC application 24) ID or other UE identifier in the message to that identify a plurality of target UEs (e.g., UE 15) intended to receive the trigger. In other embodiments, an Application server 26 may directly send the trigger to the MTC-IWF 54. In some embodiments, a secure connection may be established between the MTC-IWF 54 and the SCS 52 for transmissions at 1102.

At 1104, in response to receiving the trigger at 1102, the MTC-IWF 54 may Query the HLR/HSS 56 to obtain routing information to deliver a triggering indication to the UE 15 over the T5a/T5b reference point. In some embodiments, the MTC-IWF 54 may send UE identifier such as, for example, the MTC device ID to the HLR/HSS 56, which may have the MTC Device ID or other identifiers as part of an MTC subscription. The HLR/HSS 56 may map the MTC Device ID to an IMSI of target UEs and send the IMSI along with an address for the SGSN/MME 58 back to the MTC-IWF 54. A trust relation may be established between the MTC-IWF 54 and the HLR/HSS 56 in some embodiments (e.g., when the MTC-IWF 54 is outside of a domain of an operator of the core network). In response to receiving the query at 1104 from the MTC-IWF 54, the HLR/HSS 56 may send to the MTC-IWF 54 IMSI serving node identities and/or other information such as operator policy, authorization information, failure indication with cause value, and the like.

At 1106, the MTC-IWF 54 may send the triggering indication to the SGSN/MME 58 over the T5a/T5b reference point to be forwarded to the target UEs. The MTC-IWF 54 may use the IMSI to send the request and the small data payload to the SGSN/MME 58.

At 1108, the SGSN/MME 58 may send a paging message including the triggering indication to the RAN 20, which may in turn, send, at 1110, a paging message including the triggering indication to the UE 15. The triggering indication may be included in a paging message that is broadcasted in a tracking area of target UEs 15. The SGSN/MME 58 may be configured to send the paging message including the triggering indication over a control plane in some embodiments.

A new MTC trigger indication can be communicated in the paging message sent by the RAN 20 (e.g., Node B or the eNB station) to the UE 15 at 1110. For example, the paging message may notify MTC devices that a system information block (SIB) is being broadcast by the RAN 20. The SIB may include an MTC trigger indication and an MTC group ID. The SIB may be referred to as an MTC SIB. If an MTC group ID is included, only MTC devices belonging to the corresponding MTC group may be configured to acquire the SIB. If an MTC group ID is not included, all MTC devices can acquire the MTC SIB. In a RAN 20 configured as an E-UTRAN, the scheduling information of the MTC SIB can be provided in a Type 1 SIB (SIB1). An MTC device can first acquire SIB1 information and subsequently acquire the MTC SIB based on the scheduling information of the MTC SIB that is included in the SIB1. Table 8 depicts an example paging message format with group triggering sent from the RAN 20 to the UE 15 at 1110.

TABLE 8

Example Paging Message Format with Group Triggering

```
-- ASN1START
Paging ::=                    SEQUENCE {
    pagingRecordList              PagingRecordList          OPTIONAL,     -- Need ON
    systemInfoModification        ENUMERATED {true}         OPTIONAL,     -- Need ON
    etws-Indication               ENUMERATED {true}         OPTIONAL,     -- Need ON
    nonCriticalExtension              Paging-v890-IEs           OPTIONAL
}

Paging-v890-IEs ::=           SEQUENCE {
    lateNonCriticalExtension      OCTET STRING              OPTIONAL,     -- Need OP
    nonCriticalExtension          Paging-v920-IEs           OPTIONAL
}
```

TABLE 8-continued

Example Paging Message Format with Group Triggering

```
Paging-v920-IEs       ::=     SEQUENCE {
    cmas-Indication-r9            ENUMERATED {true}              OPTIONAL,       -- Need ON
    nonCriticalExtension          Paging-v11-IEs                 OPTIONAL
}
Paging-v11-IEs ::=    SEQUENCE {
    mtcGroupTriggerRecordList     MtcGroupTriggerRecordList      OPTIONAL,       -- Need ON
    nonCriticalExtension          SEQUENCE { }                   OPTIONAL        }
}
MtcGroupTriggerRecordList ::=     SEQUENCE(SIZE (1..maxMtcGroupTriggerRec)) OF
MtcGroupTriggerRecord
MtcGroupTriggerRecord ::=         SEQUENCE {
    Grouptrigger-Indication-r11       ENUMERATED {true}          OPTIONAL        -- Need ON
    groupidMtc                        GroupId                    OPTIONAL,       -- Need ON
    ...
}
GroupId ::=           SEQUENCE{
    GroupId           OCTET STRING(SIZE(N))
...
}
PagingRecordList ::=              SEQUENCE (SIZE (1..maxPageRec))    OF PagingRecord
PagingRecord ::=                  SEQUENCE {
    ue-Identity                       PagingUE-Identity,
    cn-Domain                         ENUMERATED   {ps, cs},
    ...
}
PagingUE-Identity ::=             CHOICE {
    s-TMSI                            S-TMSI,
    imsi                              IMSI,
    ...
}
IMSI ::=                          SEQUENCE (SIZE (6..21)) OF IMSI-Digit
IMSI-Digit ::=                    INTEGER (0..9)
-- ASN1STOP
```

Subsequent to receiving the paging message at 1110 that includes the MTC group trigger notification corresponding to an MTC group that the MTC device belongs to, the MTC device (e.g., UE 15) may receive from the RAN 20 SIB1 information and subsequently receive SIB information based on scheduling information of MTC SIB included in SIB1. Table 9 depicts an example format for SIB1 information. The SIB1 may include contain information relevant for evaluating whether a UE is allowed to access a cell and defines scheduling of other system information.

TABLE 9

Example Format for SIB1 Information with Group Triggering

```
-- ASN1START
SystemInformationBlockType1 ::=   SEQUENCE {
    cellAccessRelatedInfo             SEQUENCE {
        plmn-IdentityList                 PLMN-IdentityList,
        trackingAreaCode                  TrackingAreaCode,
        cellIdentity                      CellIdentity,
        cellBarred                        ENUMERATED {barred, notBarred},
        intraFreqReselection              ENUMERATED {allowed, notAllowed},
        csg-Indication                    BOOLEAN,
        csg-Identity                      CSG-Identity               OPTIONAL    -- Need OR
    },
    cellSelectionInfo                 SEQUENCE {
        q-RxLevMin                        Q-RxLevMin,
        q-RxLevMinOffset                  INTEGER (1..8)             OPTIONAL    -- Need OP
    },
    p-MAX                             P-MAX                          OPTIONAL,   -- Need OP
    freqBandIndicator                 INTEGER (1..64),
    schedulingInfoList                SchedulingInfoList,
    tdd-Config                        TDD-Config                     OPTIONAL,   -- Cond TDD
    si-WindowLength                   ENUMERATED {
                                          ms1, ms2, ms5, ms10, ms15, ms20,
                                          ms40},
    systemInfoValueTag                INTEGER (0..31),
    nonCriticalExtension              SystemInformationBlockType1-v890-IEs        OPTIONAL
}
SystemInformationBlockType1-v890-IEs::= SEQUENCE {
    lateNonCriticalExtension          OCTET STRING       OPTIONAL,   -- Need OP
    nonCriticalExtension              SystemInformationBlockType1-v920-IEs        OPTIONAL
}
```

TABLE 9-continued

Example Format for SIB1 Information with Group Triggering

```
SystemInformationBlockType1-v920-IEs ::=   SEQUENCE {
    ims-EmergencySupport-r9         ENUMERATED {true}           OPTIONAL,   -- Need OR
    cellSelectionInfo-v920          CellSelectionInfo-v920      OPTIONAL,   -- Cond RSRQ
    nonCriticalExtension            SEQUENCE { }                OPTIONAL }
PLMN-IdentityList ::=               SEQUENCE (SIZE (1..6)) OF PLMN-IdentityInfo
PLMN-IdentityInfo ::=               SEQUENCE {
    plmn-Identity                       PLMN-Identity,
    cellReservedForOperatorUse          ENUMERATED {reserved, notReserved}
}
SchedulingInfoList ::= SEQUENCE (SIZE (1..maxSI-Message)) OF SchedulingInfo
SchedulingInfo ::=   SEQUENCE {
    si-Periodicity                  ENUMERATED {
                                        rf8, rf16, rf32, rf64, rf128, rf256, rf512},
    sib-MappingInfo                 SIB-MappingInfo
}
SIB-MappingInfo ::= SEQUENCE (SIZE (0..maxSIB-1)) OF SIB-Type
SIB-Type ::=                        ENUMERATED {
                                        sibType3, sibType4, sibType5, sibType6,
                                        sibType7, sibType8, sibType9, sibType10,
                                        sibType11, sibType12-v920, sibType13-v920,
                                        sibType14-v11,
                                        spare4, spare3, spare2, spare1, ...}
CellSelectionInfo-v920 ::=          SEQUENCE {
    q-QualMin-r9                        Q-QualMin-r9,
    q-QualMinOffset-r9                  INTEGER (1..8)          OPTIONAL   -- Need OP
}
-- ASN1STOP
```

Table 10 depicts an example format for MTC SIB (SIB14). The MTC SIB (SIB14) may be a new system information block defined to carry contents of the MTC trigger information and may also include an MTC Group ID. The MTC SIB may contain MTC trigger information for multiple MTC groups.

ered to the UE 15. The SCS 52 may, for example, send the acknowledgement to the Application server 26 in response to the trigger.

At 1118, the UE 15 may be triggered to establish communication with the SCS 52 in response to the paging message and/or SIB information including the triggering indication

TABLE 10

Example Format for SIB1 Information with Group Triggering

```
-- ASN1START
SystemInformationBlockType14-r11 ::=   SEQUENCE {
    mtcTriggerInformationRecordList         MtcTriggerInformationRecordList OPTIONAL,   -- Need ON
    lateNonCriticalExtension                OCTET STRING                    OPTIONAL,   -- Need OP
    ...
}
MtcTriggerInformationRecordList ::=         SEQUENCE (SIZE (1..maxMtcTriggerInformationRec)) OF
MtcTriggerInformationRecord
MtcTriggerInformationRecord ::=             SEQUENCE {
    mtcTriggerInformation                       MtcTriggerInformation,
    groupidMtc                                  GroupId                     OPTIONAL,   -- Need ON
}
MtcTriggerInformation ::=                   SEQUENCE{
    triggerInformation                          OCTET STRING(SIZE(128)),
    nonCriticalExtension                        SEQUENCE { }                OPTIONAL    -- Need OP
}
GroupId ::=          SEQUENCE{
    GroupId          OCTET STRING(SIZE(N))
...
}
-- ASN1STOP
```

In some embodiments, the RAN 20 may inform the SGSN/MME 58 that the triggering indication was successfully delivered by sending, at 1112, an acknowledgement to the SGSN/MME 58, which may be forwarded by the SGSN/MME 58 to the MTC-IWF 54 at 1114. At 1116, the SGSN/MME 58 may forward to the MTC-IWF 54 the acknowledgement that the small data payload has been sent to the UE 15. At 1116, the MTC-IWF 54 may forward the acknowledgement to the SCS 52 or otherwise send a trigger to the SCS 52 to send an acknowledgement that the small data payload has been delivered at 1110. The triggering indication as described herein may be configured to initiate a communication between the MTC server (e.g., SCS 52) and selected MTC devices (e.g., MTC group) that receive the triggering indication.

Figure 12:
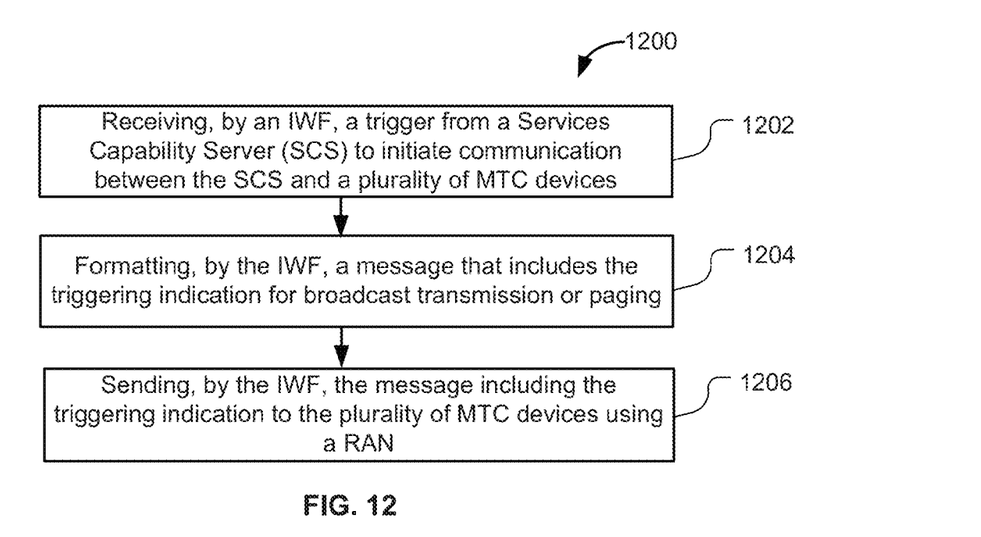
FIG. 12 is a flow diagram of a method for triggering a plurality of wireless devices, in accordance with some embodiments.

FIG. 12 is a flow diagram of a method 1200 for triggering a plurality of wireless devices, in accordance with some embodiments. The method 1200 may comport with techniques described in connection with FIGS. 1-11.

At 1202, the method 1200 includes receiving, by an IWF (e.g., MTC-IWF 54 of FIG. 2), a trigger from a Services Capability Server (SCS) (e.g., SCS 52 of FIG. 2) to initiate communication between the SCS and a plurality of MTC devices. The actions at 1202 may comport with actions described in connection with 302 of FIG. 3 and/or 1102 of FIG. 11.

At 1204, the method 1200 may further include formatting, by the IWF, a message that includes the triggering indication for broadcast transmission or paging. In some embodiments, the IWF may function as a CBE. For example, the IWF may split a CBS message into a number of pages for broadcast transmission by a CBC (e.g., CBC 60 of FIG. 2). The IWF may determine whether to send the message by broadcast or paging using any suitable criteria (e.g., availability).

At 1206, the method 1200 may further include sending, by the IWF, the message including the triggering indication to the plurality of MTC devices using a RAN (e.g., RAN 20 of FIG. 2). The IWF may send the message by broadcast or paging based on the determination by the IWF. In some embodiments, the IWF may send the triggering indication in a CBS message to the RAN via a CBC over a reference point between the IWF and the CBC. The triggering indication may be sent in accordance with actions at 304 described in connection with FIG. 3. The RAN may be a GERAN or UTRAN in some embodiments.

In other embodiments, the IWF may send the triggering indication in a paging message to the RAN via a SGSN/MME (e.g., SGSN/MME 58 of FIG. 2) over a reference point between the IWF and the SGSN/MME. The paging message may be configured to notify individual MTC devices of the plurality of MTC devices of a broadcast transmission of an MTC SIB. The triggering indication may be sent in accordance with actions at 1106 described in connection with FIG. 11.

Various operations are described as multiple discrete operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Figure 13:
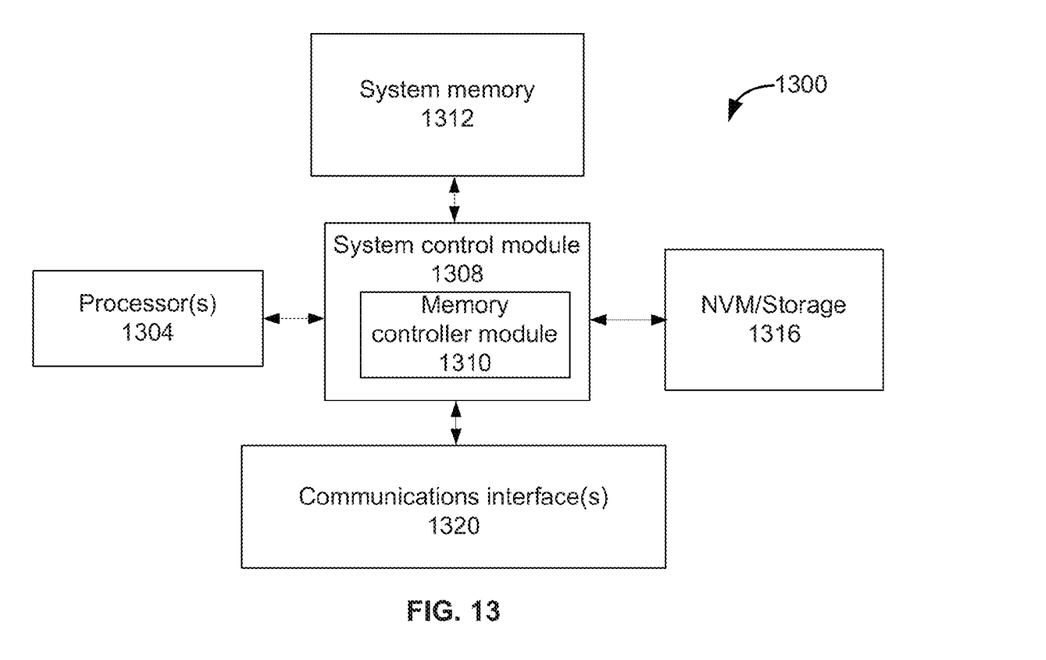
FIG. 13 schematically illustrates an example system that may be used to practice various embodiments described herein.

Embodiments of the present disclosure may be implemented into a system using any suitable hardware and/or software to configure as desired. FIG. 13 schematically illustrates an example system 1300 that may be used to practice various embodiments described herein. FIG. 13 illustrates, for one embodiment, an example system 1300 having one or more processor(s) 1304, system control module 1308 coupled to at least one of the processor(s) 1304, system memory 1312 coupled to system control module 1308, non-volatile memory (NVM)/storage 1316 coupled to system control module 1308, and one or more communications interface(s) 1320 coupled to system control module 1308.

In some embodiments, the system 1300 may be capable of functioning as the UE 15 as described herein. In some embodiments, a system control module 1308 of the UE 15 may include a NAS module and an AS module for respective signaling. In other embodiments, the system 1300 may be capable of functioning as the one or more servers 50 of FIG. 1 or otherwise provide logic/module that performs functions as described for base stations 40, 42, CBC 60, one or more nodes 45, SCS 52, MTC-IWF 54, HLR/HSS 56, SGSN/MME 58, RAN 20, GGSN/PGW 51, and other modules described herein. In some embodiments, the system 1300 may include one or more computer-readable media (e.g., system memory or NVM/storage 1316) having instructions and one or more processors (e.g., processor(s) 1304) coupled with the one or more computer-readable media and configured to execute the instructions to implement a module to perform actions described herein.

System control module 1308 for one embodiment may include any suitable interface controllers to provide for any suitable interface to at least one of the processor(s) 1304 and/or to any suitable device or component in communication with system control module 1308.

System control module 1308 may include memory controller module 1310 to provide an interface to system memory 1312. The memory controller module 1310 may be a hardware module, a software module, and/or a firmware module.

System memory 1312 may be used to load and store data and/or instructions, for example, for system 1300. System memory 1312 for one embodiment may include any suitable volatile memory, such as suitable DRAM, for example. In some embodiments, the system memory 1312 may include double data rate type four synchronous dynamic random-access memory (DDR4 SDRAM).

System control module 1308 for one embodiment may include one or more input/output (I/O) controller(s) to provide an interface to NVM/storage 1316 and communications interface(s) 1320.

The NVM/storage 1316 may be used to store data and/or instructions, for example. NVM/storage 1316 may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s), for example.

The NVM/storage 1316 may include a storage resource physically part of a device on which the system 1300 is installed or it may be accessible by, but not necessarily a part of, the device. For example, the NVM/storage 1316 may be accessed over a network via the communications interface(s) 1320. The system may include other non-transitory storage in other embodiments.

Communications interface(s) 1320 may provide an interface for system 1300 to communicate over one or more network(s) and/or with any other suitable device. The system 1300 may wirelessly communicate with the one or more components of the wireless network in accordance with any of one or more wireless network standards and/or protocols.

For one embodiment, at least one of the processor(s) 1304 may be packaged together with logic for one or more controller(s) of system control module 1308, e.g., memory controller module 1310. For one embodiment, at least one of the processor(s) 1304 may be packaged together with logic for one or more controllers of system control module 1308 to form a System in Package (SiP). For one embodiment, at least one of the processor(s) 1304 may be integrated on the same die with logic for one or more controller(s) of system control module 1308. For one embodiment, at least one of the processor(s) 1304 may be integrated on the same die with logic for one or more controller(s) of system control module 1308 to form a System on Chip (SoC).

In various embodiments, the system 1300 may be, but is not limited to, a server, a workstation, a desktop computing device, or a mobile computing device (e.g., a laptop computing device, a handheld computing device, a tablet, a netbook, etc.). In various embodiments, the system 1300 may have more or less components, and/or different architectures. For example, in some embodiments, the system 1300 includes one or more of a camera, a keyboard, liquid crystal display (LCD) screen (including touch screen displays), non-volatile memory port, multiple antennas, graphics chip, application-specific integrated circuit (ASIC), and speakers.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. One or more non-transitory computer-readable media having instructions stored thereon, that when executed by one or more processors, result in a cell broadcast center (CBC):
   receiving, from an interworking function (IWF) or services capability server (SCS) of a wireless communication network, a triggering indication to initiate a communication between a machine type communication (MTC) server and a plurality of MTC devices; and
   sending the triggering indication in a cell broadcasting service (CBS) message to a base station controller (BSC) or a radio network controller (RNC),
   wherein the CBS message is to include a small data information element (IE) to indicate communication of a data payload having a size less than a predetermined threshold.

2. The one or more non-transitory computer-readable media of claim 1, wherein the CBS message is a write-replace message.

3. The one or more non-transitory computer-readable media of claim 1, wherein:
   the CBS message includes a message identifier information element (IE); and
   the message identifier IE has a value that indicates group triggering of the plurality of MTC devices.

4. The one or more non-transitory computer-readable media of claim 1, wherein the CBS message includes a message content information element (IE) having triggering information, the triggering information including a user equipment (UE) identifier that identifies individual MTC devices of the plurality of MTC devices that are to receive the triggering indication.

5. The one or more non-transitory computer-readable media of claim 4, wherein individual MTC devices of the plurality of MTC devices are configured to act on the triggering indication based on a value of the UE identifier.

6. The one or more non-transitory computer-readable media of claim 1, wherein the CBS message includes a trigger indicator information element (IE), the trigger indicator IE including triggering information associated with the triggering indication, the triggering information including the triggering indication.

7. An apparatus comprising:
   one or more non-transitory, computer-readable media having instructions; and
   one or more processors coupled with the one or more computer-readable media and configured to execute the instructions to:
      process a trigger indication, received from an interworking function (IWF) or services capability server (SCS) of a wireless communication network, the trigger indication to initiate a communication between a machine type communication (MTC) server and a plurality of MTC devices;
      send the triggering indication in a cell broadcasting service (CBS) message to a base station controller (BSC) or a radio network controller (RNC), wherein the CBS message is to include a small data information element (IE) to indicate communication of a data payload having a size less than a predetermined threshold.

8. The apparatus of claim 7, wherein:
   if the trigger indication is sent to the BSC, the BSC is to broadcast the CBS message using a base transceiver station (BTS) of a global system for mobile communications (GSM) having enhanced data rates for GSM evolution (EDGE) radio access network (GERAN); and
   if the trigger indication is sent to the RNC, the RNC is to broadcast the CBS message using an enhanced node B (eNB) station of a universal terrestrial radio access network (UTRAN).

9. The apparatus of claim 7, wherein the one or more processors are to execute the instructions to determine a set of cells that are to receive a broadcast of the CBS message.

10. The apparatus of claim 7, wherein:
   the apparatus is part of a cell broadcast center (CBC); and
   the wireless communication network includes a global system for mobile communication (GSM), general packet radio service (GPRS), universal mobile telecommunications system (UMTS), high speed packet access (HSPA), evolved HSPA (E-HSPA), or long term evolution (LTE) network.

* * * * *